(12) United States Patent
Tajima et al.

(10) Patent No.: US 6,588,935 B1
(45) Date of Patent: Jul. 8, 2003

(54) WHEEL BEARING ASSEMBLY

(75) Inventors: Eiji Tajima, Shizuoka (JP); Akira Torii, Shizuoka (JP)

(73) Assignee: NTN Corporation, Osaka (JP)

( * ) Notice: Subject to any disclaimer, the term of this patent is extended or adjusted under 35 U.S.C. 154(b) by 36 days.

(21) Appl. No.: 09/666,470

(22) Filed: Sep. 20, 2000

(30) Foreign Application Priority Data

Sep. 21, 1999 (JP) .............................................. 11-267416
Nov. 25, 1999 (JP) .......................................... 11-334745
Jan. 25, 2000 (JP) ....................................... 2000-015427

(51) Int. Cl.[7] ............................................. F16C 19/08
(52) U.S. Cl. ....................................... 384/544; 384/448
(58) Field of Search .............................. 384/448, 174, 384/446, 544, 589

(56) References Cited

U.S. PATENT DOCUMENTS 5,702,162 A * 12/1997 Pressler ...................... 384/448
5,852,361 A * 12/1998 Ouchi et al. ................. 324/174

* cited by examiner

Primary Examiner—Lenard A. Footland
(74) Attorney, Agent, or Firm—Wenderoth, Lind & Ponack, L.L.P.

(57) ABSTRACT

A wheel bearing assembly has an outer member having a flange adapted to be mounted to a vehicle body and formed with two raceways on inner surface thereof, an inner member having a flange on which a vehicle wheel is adapted to be mounted and formed with a first raceway on outer surface thereof, an inner ring formed with a second raceway on outer surface thereof, a plurality of rolling elements disposed between the raceways on the outer member and the first and second raceways, and a constant-velocity joint having an outer member comprising a cup portion and a stem portion. The stem portion is mounted in the inner member through mesh engagement. The inner ring is mounted on the outer member of the constant-velocity joint with its outboard end abutting an inboard end of the inner member.

13 Claims, 16 Drawing Sheets

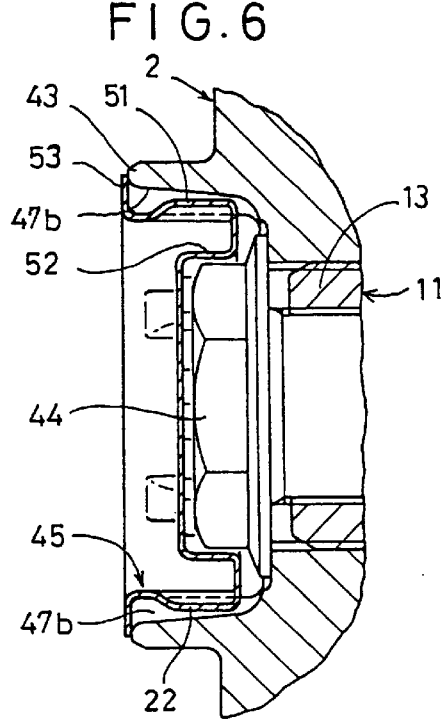
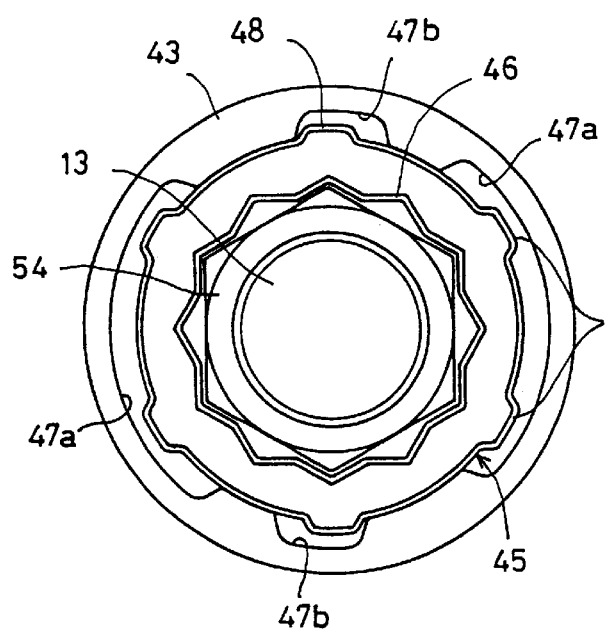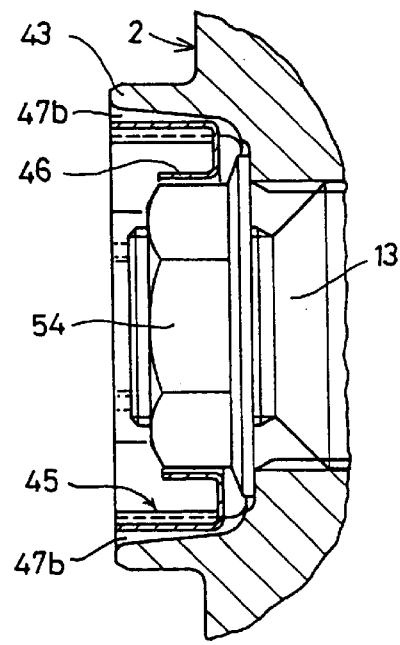

WHEEL BEARING ASSEMBLY

BACKGROUND OF THE INVENTION

This invention relates to a wheel bearing assembly for rotatably supporting a vehicle wheel relative to a vehicle body, and more particularly to a wheel bearing assembly comprising a hub ring, an outer member of a constant-velocity joint and a double-row wheel bearing in a modular form.

A conventional wheel bearing assembly shown in FIG. 17 includes an outer member 1, an inner member 2, an inner ring 3 and rolling elements 4 arranged in two rows. The inner member 2 has at its outboard end a radially outwardly extending flange 5 for mounting a vehicle wheel, and is formed with a first raceway 6a on its radially outer surface. The inner ring 3 is pressed on a cut-out, small-diameter cylindrical portion 7 of the inner member 2 at its inboard end. It is formed with a second raceway 6b on its radially outer surface.

The outer member 1 is formed with first and second raceways 8a, 8b on its radially inner surface, opposite the first and second raceways 6a, 6b, respectively. The rolling elements 4 are mounted between opposed pairs of the raceways. The outer member 1 has on its radially outer surface a flange 9 adapted to be fastened to an unillustrated vehicle suspension.

The inner member 2 is coupled to an outer member 11 of a constant-velocity joint (CVJ) 10. The CVJ outer member 11 comprises a cup 12 and a stem 13. The stem is inserted into and coupled to the inner member 2 by serrations with its threaded end 14 protruding from the outboard end of the inner member. A nut 15 is threaded onto the threaded end 14 of the stem 13 and tightened to press the inner member 2 against a shoulder 16 with the inner member 2 and the inner ring 3 axially positioned relative to each other, thereby applying a preload to the rolling elements 4. The rolling elements each have a contact angle. The abovesaid preload increases the bearing rigidity and allows the rolling elements to bear a moment load.

In the arrangement of FIG. 18 (disclosed in Japanese patent publication 10-297208), the inner member 2 is coupled to the stem 13 of the CVJ outer member 11 by serrations 17. The inner ring 3 is pressed both on the inner member 2 and the CVJ outer member 11 and coupled thereto by serrations 18. Since the CVJ outer member 11 is coupled to the bearing assembly through both the serrations 17 and 18, a larger torque can be transmitted between the CVJ and the bearing assembly than in the arrangement of FIG. 17.

In this arrangement, because the inner ring 3 is partially pressed on the CVJ outer member 11, the axial length of the bearing assembly is relatively short. But since the CVJ outer member has to be coupled to the bearing through the radially spaced two different sets of serrations, it is troublesome to assemble such a bearing assembly.

A first object of the present invention is to provide a wheel bearing assembly that is compact, lightweight and easy to assemble.

FIG. 19A shows another conventional wheel bearing assembly, which comprises an outer member 1 into which is pressed an outer ring 19 formed with two annular raceways on its radially inner surface, and an inner member 2 onto which are pressed two separate inner rings 3 formed with raceways 6a, 6b on the respective radially outer surfaces thereof, opposite the raceways 8a, 8b. Rolling elements 4 are disposed between the two opposed pairs of raceways. The inner member 2 has a flange to which is adapted to be mounted a vehicle wheel.

A stem 13 of an outer member 11 of a constant-velocity joint (CVJ) 10 is inserted into a serrated bore 20 of the inner member 2 with its threaded free end protruding into a pilot portion 21 of the flange 5. A nut 22 is threaded onto the threaded end of the stem 13 to fasten the CVJ outer member 11 to the inner member 2.

Contrary to a wheel bearing assembly for supporting a driving wheel, a typical bearing assembly for supporting a non-driving wheel has its outer member mounted to the wheel through its flange and its inner member directly secured to the end of a stationary axle.

The wheel bearing assembly is fastened to the stationary axle or to the wheel drive shaft by e.g. threading a bolt having a polygonal head or a head with a polygonal hole into the end of the stationary shaft or the wheel drive shaft.

Such a bolt or nut tends to loosen due e.g. to vibration of the vehicle. Thus, it is desired to provide such a bolt or nut with a means for preventing it from loosening various means for preventing loosening of a nut such as the nut shown in FIG. 19A are known. For example, in the arrangement of FIG. 19B, the nut is prevented from loosing by pressing a snap ring 23 into a cutout 13a formed in the stem 13 near its tip by deforming (e.g. caulking) the ring 23. Also, a pin may be inserted into the stem to prevent loosening of the nut. A double-nut arrangement is another well-known means for preventing loosening.

But there is not known any means for preventing loosening of a bolt threaded into a shaft.

A second object of the present invention is to provide a wheel bearing assembly having a means for preventing loosening of a nut threaded onto a shaft or a bolt threaded into the shaft to fasten the shaft to the bearing.

FIG. 20 shows another conventional bearing assembly for a driving wheel, comprising the bearing assembly of FIG. 17 with a constant-velocity joint 10 including an outer member 11 and an inner ring 29, a brake rotor 24 and a knuckle 25 assembled together in a modular form.

A pulser ring 26 for ABS is mounted on the outer surface of the cup 12 of the CVJ outer member 11. A sensor (not shown) is mounted on a vehicle body (not shown either), opposite the pulser ring 26.

The brake rotor 24 is mounted on a flange 5 of the inner member 2 by bolts 31. The knuckle 25 is mounted to the flange 9 of the outer member 1 by bolts 27.

The bearing gap defined between the inner member 2 and the outer member 1 has its outboard and inboard ends sealed by seals 28a and 28b, respectively. Rolling elements 4 are disposed in the bearing gap.

Since the inner ring 3 is pressed onto the inner member 2 and not onto the CVJ outer member 11. Thus, even when the latter is pulled out of the inner member 2 for maintenance, the inner ring 3 will remain coupled to the inner member 2.

Such the bearing assembly tends to be heavy because it includes many heavy parts. A lightweight bearing assembly is therefore desired. Also in these conventional arrangements, the gap between the seal 28a and the outboard rolling elements 4, the gap between the outboard and inboard rolling elements 4, and the gap between the seal 28b and the inboard rolling elements 4 are too small to mount the pulser ring 26 and a sensor therein.

A third object of the invention is to provide a wheel bearing assembly that is lightweight, has a sufficiently large closed space in which a pulser ring and a sensor can be mounted, and can form a bearing assembly together with other parts.

SUMMARY OF THE INVENTION

According to this invention, in order to attain the first object, there is provided a wheel bearing assembly comprising an outer member having a flange adapted to be mounted to a vehicle body and formed with first and second raceways on inner surface thereof, an inner member having a flange on which a vehicle wheel is adapted to be mounted and formed with a first raceway on outer surface thereof, an inner ring formed with a second raceway on outer surface thereof, a plurality of rolling elements disposed between the raceways on the outer member and the first and second raceways, a constant-velocity joint having an outer member comprising a cup portion and a stem portion, the stem portion engaging the inner member through mesh engagement, the inner ring being mounted on the outer member of the constant-velocity joint with its outboard end abutting an inboard end of the inner member.

The inner ring may be coupled to the CVJ outer member by pressing the former onto the latter. The engagement means may comprise splines, serrations or keys.

In the prior art arrangement of FIG. 17 or 18, since the inner ring is pressed onto the inner member, the inner member inevitably has a small inner diameter than the inner ring. In the arrangement of this invention, since the inner ring is pressed onto the CVJ outer member with its outboard end abutting the inboard end of the inner member, it is possible to reduce the thickness of the inner member and thus increase the outer diameter of the stem and thus the serrations thereon. This makes it possible to reduce the axial length of serrations and thus the axial length of the entire bearing assembly. Also, because a greater strength is assured with a larger-diameter stem, it is possible to use a hollow and thus lightweight stem. Since the inner member is also thin and thus lightweight, the entire assembly is lightweight. Since the CVJ outer member is coupled to the inner member by serrations at a single location, the bearing assembly of this invention can be assembled more easily than the arrangement of FIG. 18.

The inner ring is secured onto the CVJ outer member instead of being butted against the shoulder of the CVJ outer member. Thus, the bearing assembly of this invention may have a smaller axial length than the bearing assembly of FIG. 17. To reduce the axial length of the bearing assembly, the inboard raceway may directly formed on the shoulder of the CVJ outer ring while omitting the inner ring. (This arrangement is not shown.)

But the CVJ outer member is ordinarily formed by induction-hardening carbon steel for machine parts such as S53C. An inboard raceway formed directly on such an induction-hardened CVJ outer member tends to be lower in hardness than a raceway formed by carburizing or hardening. A separate inner ring can be hardened, so that a harder and more durable raceway can be formed thereon. The inner ring may be formed from medium- to high-carbon steel, which can be hardened and is high in wear resistance, elastic limit and fatigue resistance.

By deforming the outboard end of the stem and engaging it against the end face of the inner member, it is possible to reliably prevent the inner member from coming out of the CVJ outer member. Also, since no nut is used, it is possible to reduce the number of parts and thus to reduce the weight of the assembly.

If the inner diameter of the inner member, especially at its end near the inner ring, is smaller than the inner diameter of the inner ring, the CVJ outer member can be easily pressed into the inner ring.

The stem portion is preferably hollow for reduced weight.

The cup portion of the CVJ outer member has a flat inner bottom. A jig is pressed against this flat bottom when the distal end of the stem is deformed or when the CVJ outer member is pressed into the inner ring to bear an axial load.

In order to attain the second object, according to the present invention, there is provided a wheel bearing assembly comprising an outer member having a flange adapted to be mounted to a vehicle body and formed with two raceways on inner surface thereof, an inner member having a flange on which a vehicle wheel is adapted to be mounted and formed with a first raceway on outer surface thereof, an inner ring formed with a second raceway on outer surface thereof, a plurality of rolling elements disposed between the raceways on the outer member and the first and second raceways, a constant-velocity joint having an outer member comprising a cup portion and a stem portion, the stem portion mounted in and engaging the inner member through mesh engagement, the flange of the inner member having a pilot portion at its outboard end, the stem portion having its outboard end inserted into and fastened to the inner member at the pilot portion by means of a fastener such as a nut and a bolt, a cap inserted into the pilot portion around the fastener, a first engaging means for engaging the fastener with the cap, and a second engaging means for engaging the cap with the pilot portion, whereby preventing the fastener from loosening.

The cap inserted into the pilot portion prevents the bolt or nut from turning in the loosening direction relative to the cap, and the cap is prevented from turning in the loosening direction relative to the pilot portion. Thus, the bolt or nut cannot turn in the loosening direction relative to the pilot portion.

The first engaging means may comprise an inner wall provided integrally with the cap inside of the cap, the fastener having a polygonal portion, the inner wall having a plurality of recesses arranged circumferentially so as to receive corners of the polygonal portion of the fastener. This allows the cap to a desired position and allows the fastener to be clamped at a suitable position.

The second engaging means may comprise at least one recess provided on one of the inner wall of the pilot portion and the cap, and at least one protrusion provided on the other so as to be received in the recess, whereby preventing the cap from loosening.

An arrangement for preventing the cap from coming out of the pilot portion is provided. The arrangement may comprise an annular groove formed in the inner wall of the pilot portion, and a circumferential rib formed on the outer surface of the cap so as to be pushed into the annular groove by caulking.

In order to attain the third object, according to the present invention, there is provided a wheel bearing assembly comprising an outer member having a flange adapted to be mounted to a vehicle body and formed with two raceways on inner surface thereof, an inner member having a flange on which a vehicle wheel is adapted to be mounted and formed with a first raceway on outer surface thereof, an inner ring formed with a second raceway on outer surface thereof, a plurality of rolling elements disposed between the raceways on the outer member and the first and second raceways, a constant-velocity joint having an outer member comprising a cup portion and a stem portion, the stem portion mounted in and engaging the inner member through mesh engagement, and a coupling member for coupling the inner member and the inner ring together with an inboard end of the inner member abutting an outboard end of the inner ring.

The inner ring may comprise an outboard inner ring and an inboard inner ring with the outboard end of the former inner ring abutting the inboard end of the inner member. In this arrangement, the coupling member couples the outboard inner ring and the inboard inner ring together.

The coupling member may comprise an annular member with or without a cutout, the annular member comprising an annular base, and a pair of flanges extending radially outwardly from side edges of the annular base and engaged in the annular grooves formed in the inner member and the inner ring or in the inboard and outboard inner rings near their abutting ends, respectively.

The engaging means formed on the bore of the inner member and the stem portion may comprise serrations. The serrations on the bore of the inner member may engage the serrations on the stem portion with a preload and the stem portion may be pressed into the inner ring with a predetermined interference.

The annular grooves should be provided inboard of the serrations. The stem portion may be hollow. The stem portion may be fastened to the inner member by a bolt threaded into the stem portion.

The cup portion is formed with a seal land on its outer surface, and the bearing assembly may further comprise a seal kept in sliding contact with the seal land, and a pulser ring mounted between the seal land and the rolling elements disposed between the inboard raceways.

A knuckle is mounted on the flange of the outer member, and a sensor is mounted to a radially inner surface of the knuckle, radially opposite the pulser ring, and the seal is mounted on the sensor. This arrangement improves the reliability of speed detection for ABS.

BRIEF DESCRIPTION OF THE DRAWINGS

FIG. 6 is a partial sectional view of a third embodiment;

FIGS. 7A and 7B are a partial enlarged sectional view and a side view of a fourth embodiment;

DETAILED DESCRIPTION OF THE PREFERRED EMBODIMENT

Figure 1:
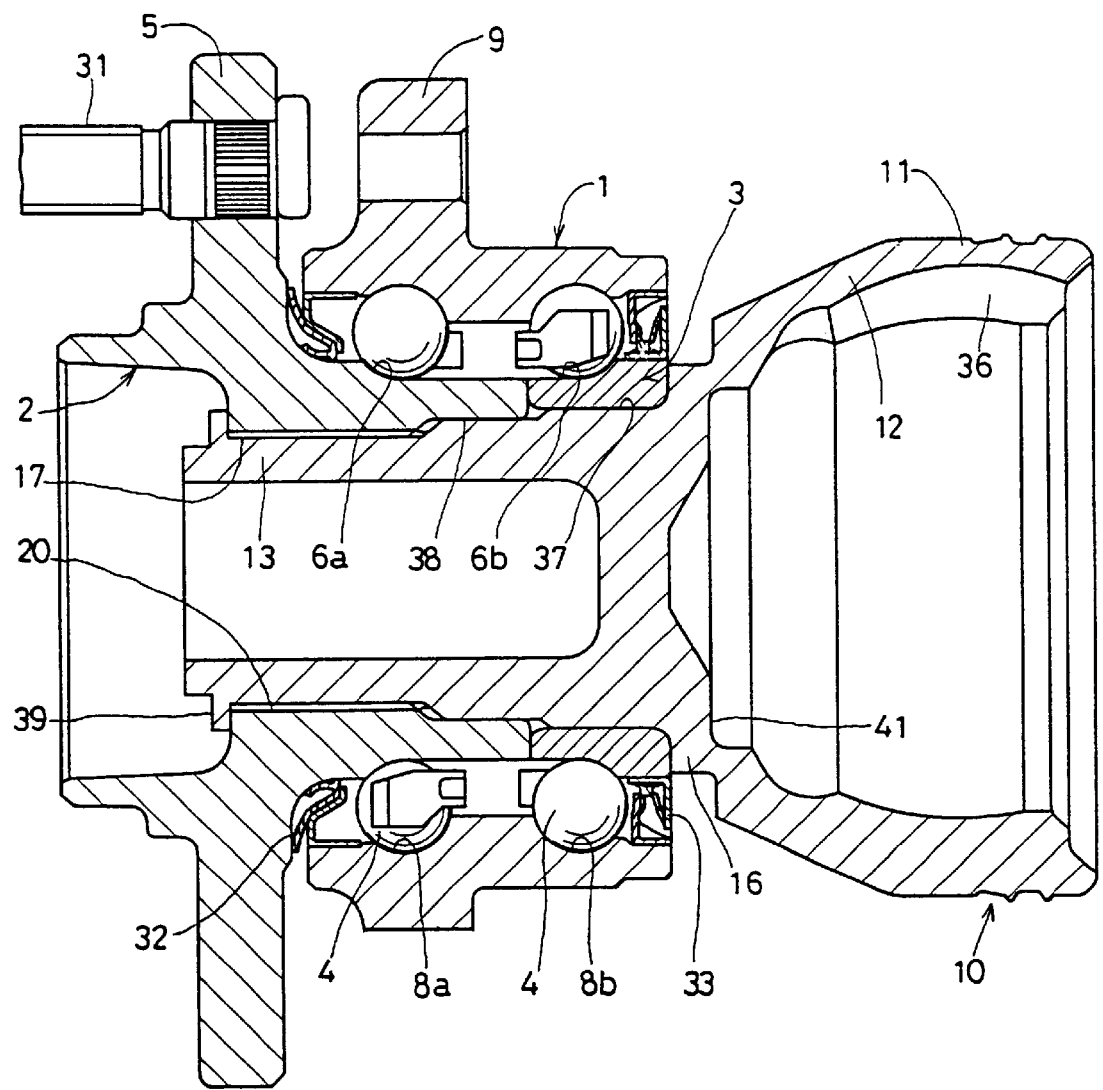
FIG. 1 is a sectional view of a first embodiment.

FIG. 1 shows a wheel bearing assembly for a driving wheel which is a first embodiment. It includes an outer member (outer ring) 1, an inner member (hub ring) 2, an inner ring 3, rolling elements 4, and an outer member 11 of a constant-velocity joint (CVJ) 10.

Figure 2:
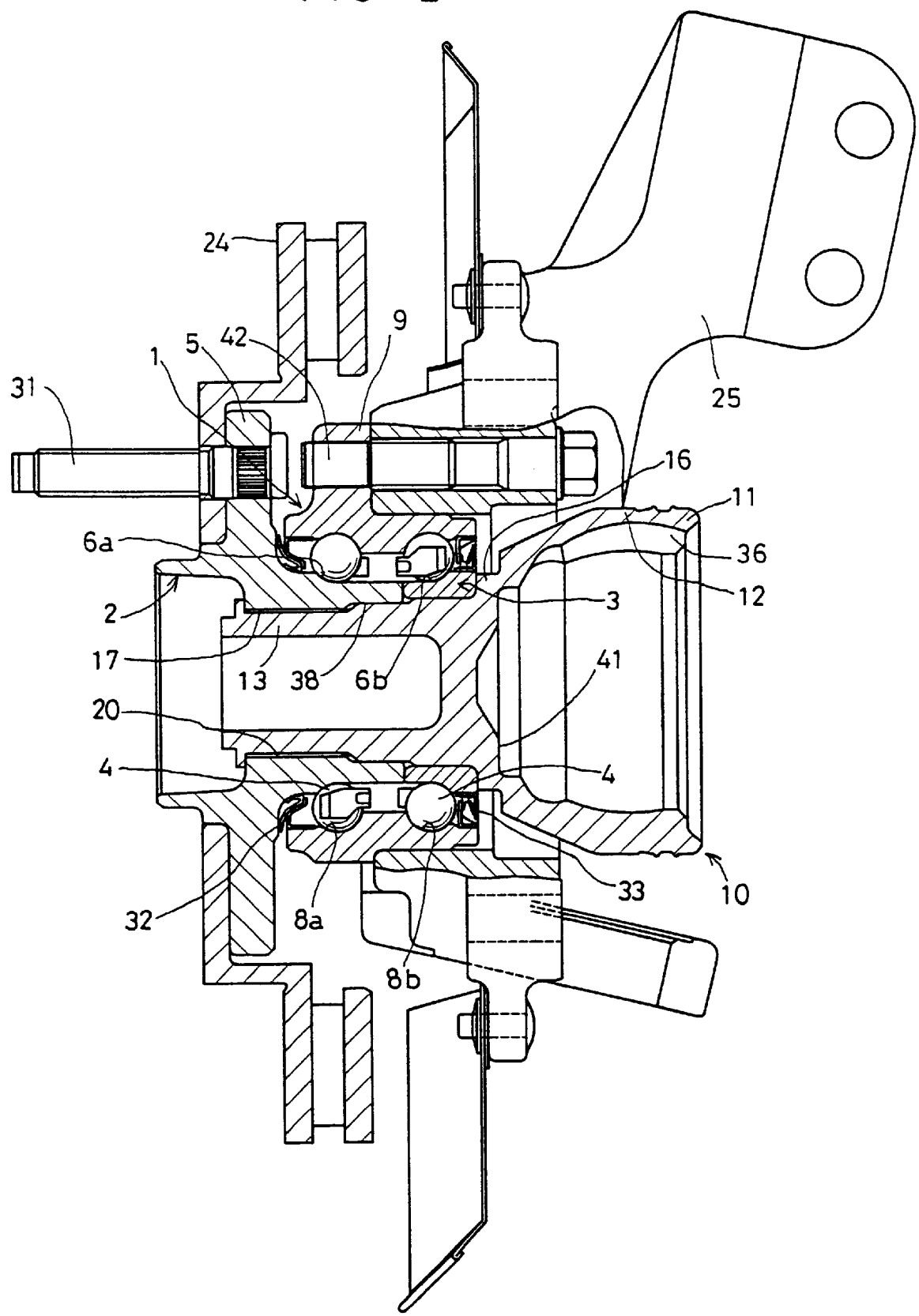
FIG. 2 is another sectional view of the same.

The outer member 1 is formed with two rows of raceways 8a, 8b on its radially inner surface and has a flange 9 mounted to a knuckle 25 extending from a suspension of the vehicle (FIG. 2). The bearing gap defined between the outer member 1 and the inner member 2 and the inner ring 3 has its both ends sealed by seals 32 and 33 to prevent leak of grease in the bearing gap and entry of foreign matter such as water into the bearing gap.

The inner member 2 is formed with a serrated bore 20 and with a first outboard raceway 6a on its radially outer surface. It is further provided with a flange 5 at its outboard end. A vehicle wheel (not shown) and a brake rotor 24 (FIG. 2) are secured to the flange 5 of the inner member 2 by means of bolts 31 at equal circumferential intervals.

The inner ring 3 is a separate member from the inner member 2 and is pressed onto a small-diameter cylindrical portion 37 on a shoulder 16 of the CVJ outer member 11 with an interference to prevent creeping. The inner ring 3 is formed of a carburized or hardened medium to high-carbon steel (such as S60C-S70C, SUJ2). A second inboard raceway 6b is formed on the radially outer surface of the inner ring 3.

The constant-velocity joint 10 comprises an inner member formed with track grooves on its radially outer surface, the outer member 11, which has a cup-shaped portion 12 surrounding the inner member and is formed with track grooves 36 on its radially inner surface, balls each received in an opposed pair of track grooves of the inner and outer members, and a cage for retaining all the balls in a single plane. (Only the outer member 11 is shown.)

The CVJ outer member 11 is coupled to a drive axle by e.g. serrations. It includes a hollow stem 13 integral with the cup portion 12 and inserted in the serrated bore 20 of the inner member 2 and coupled to the inner member 2 through e.g. by serrations 17. The inner ring 3 is pressed with a suitable interference on the cylindrical portion 37 with its outboard end abutting the inboard end of the inner member 2.

The CVJ outer member 11 is formed of an induction-hardened carbon steel for machine parts. The serrations 17 are formed not over the entire length of the bore 20 as in the conventional arrangement shown in FIG. 17, but only in the region from its outboard end to mid-portion. The remaining portion of the bore 20 forms a smooth cylindrical surface 38 kept in close contact with the outer cylindrical surface of the stem 13. For centering, the cylindrical surface 38 may be pressed onto the stem 13. The surface 38 has a diameter greater than the inner diameter of the serrations 17 on the inner member and smaller than the inner diameter of the inner ring 3.

The rolling elements 4 are disposed between the outer raceways 8a and 8b on the outer member 1 and the inner first and second raceways 6a and 6b at a predetermined contact angle. The rolling elements 4 are balls in this embodiment but may be tapered rollers instead.

The bearing assembly is formed firstly by assembling the outer member 1, inner member 2, inner ring 3 and rolling elements 4 together, and then the stem 13 of the CVJ outer member 11 is inserted into the inner ring 3 and the inner member 2 of the bearing assembly to form a unit. Since the bore formed by the serrations 17, cylindrical inner surface 38 and radially inner surface of the inner ring 3 increases stepwise toward the inboard direction, the CVJ outer member 11 can be easily pressed into the bore without interfering with the inner member 2.

With the CVJ outer member 11 pressed in, the outboard end of the stem 13 protruding from the inner member 2 is plastically deformed (e.g. caulked) radially outwardly until a caulked portion 39 is pressed against the outboard end face of the inner member 2 to firmly couple the stem 13 to the inner member 2. In this state, the inner member 2 and the inner ring 3 are pressed axially against each other with a preload acting on the rolling elements 4. When caulking the stem, a jig may be pressed against a coaxial annular flat portion 41 of the cup 12 to bear the axial force acting during caulking. A jig may also be pressed against the annular portion 41 to press the small-diameter portion 37 into the inner ring 3.

Figure 17:
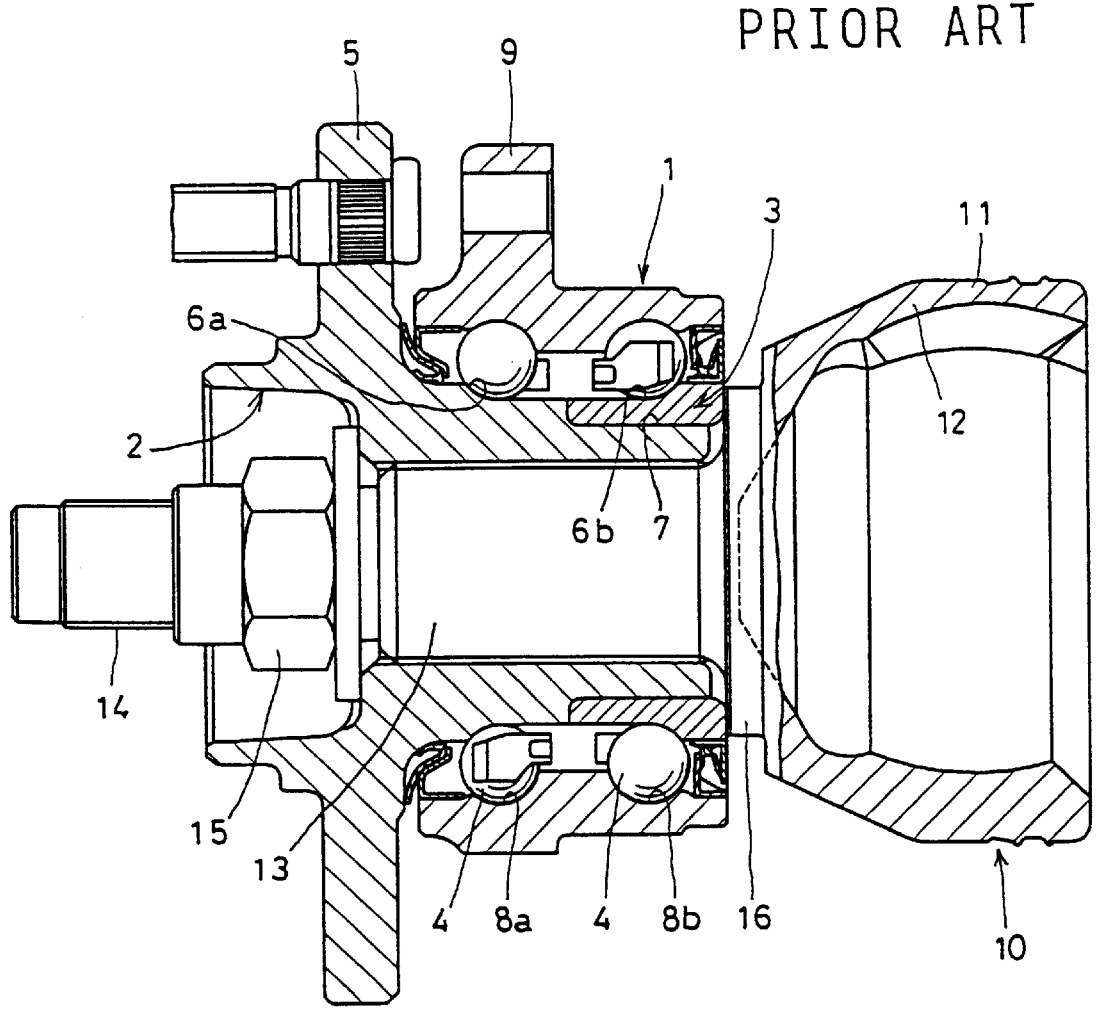
FIGS. 17 to 20 are sectional views of conventional wheel bearing assemblies.
Figure 18:
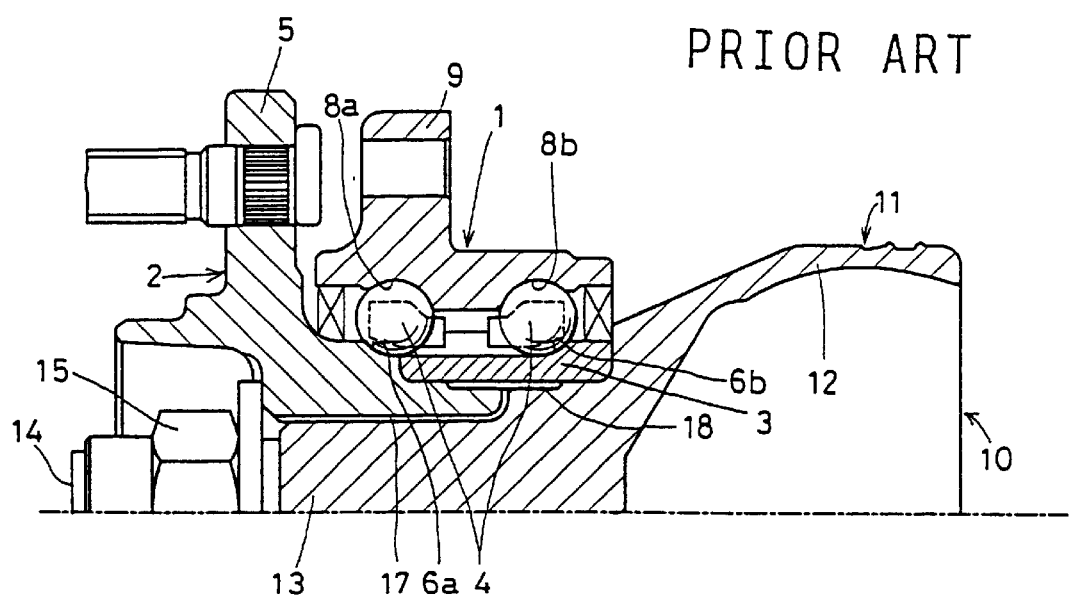
Figure 19A:
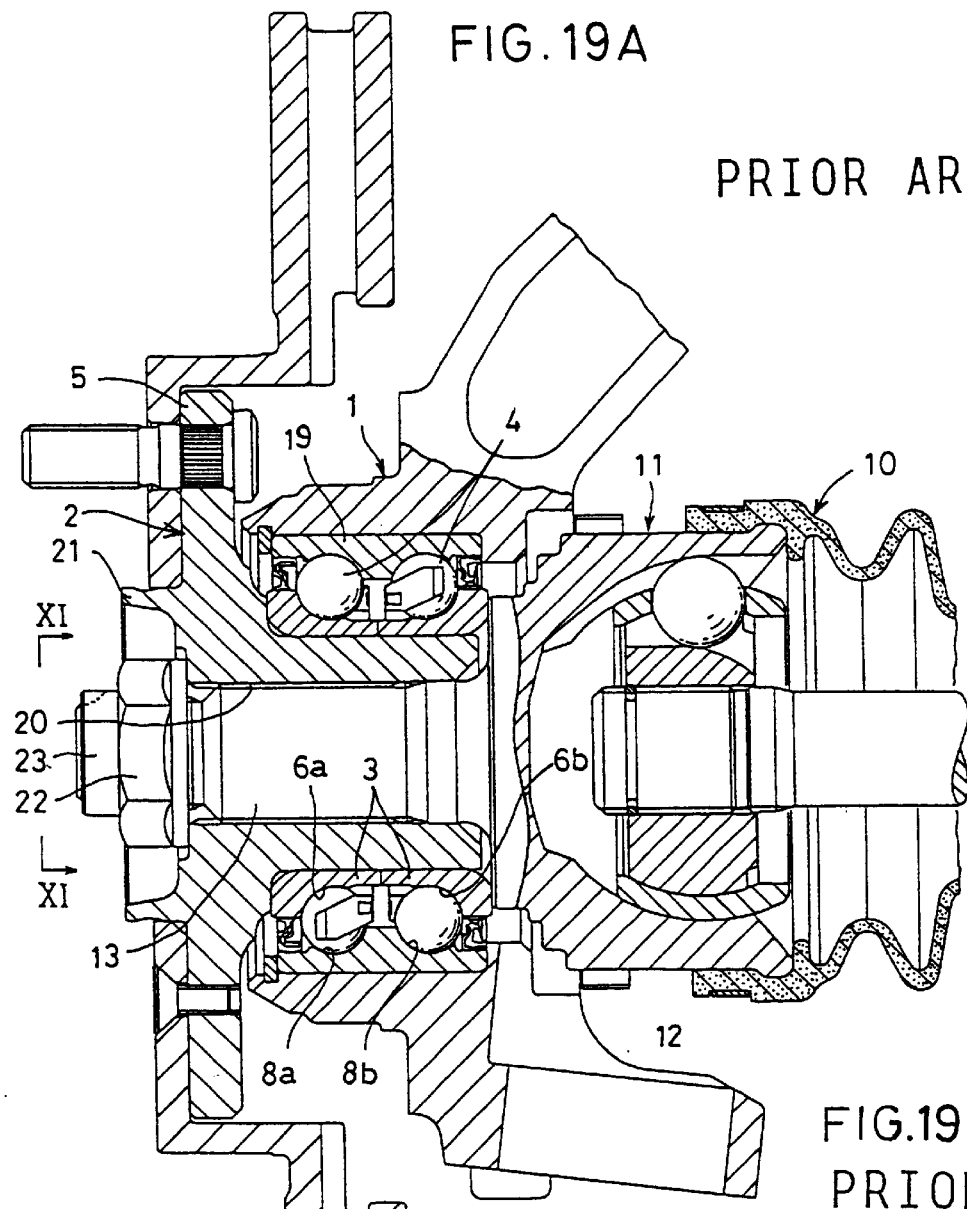
Figure 19B:
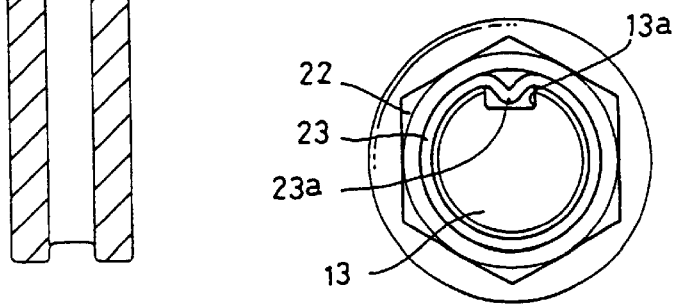

In this embodiment, instead of bringing the inner ring 3 into abutment with the shoulder 16 of the CVJ outer member 11 as in FIG. 17, the former is fitted on the shoulder 16. The bearing assembly is thus shorter in axial length than the conventional bearing assembly of FIG. 17. Since the inner ring 3 and the inner member 2 are in abutment with each other, it is possible to reduce the thickness of the inner member 2 and also increase its inner diameter and thus the inner diameter of the serrations.

Thus it is possible to transmit a sufficiently large torque through the serrations 17 even if their axial length is shortened and to further reduce the axial dimension of the entire bearing assembly. Since the serration diameter is large, it is possible to use a hollow stem 13 as shown. The bearing assembly using the hollow stem is lightweight. Another advantage of the hollow stem is that it can be easily coupled to the inner member by plastic deformation such as caulking without using a nut 15 (as in the conventional arrangement of FIG. 17). Thus, it is possible to reduce the number of parts, weight and cost of the bearing assembly. Since the inboard raceway 6b is formed on the inner ring 3 separate from the CVJ outer member 11, a harder raceway can be formed by subjecting the inner ring 3 to hardening.

The bearing assembly of this embodiment may be mounted on a vehicle body by inserting it into a knuckle 25 that has been mounted to the vehicle beforehand until the mounting flange 9 of the outer member 1 abuts the outboard end of the knuckle and securing the flange 9 to the knuckle 25 by means of bolts 42. But instead, the bearing assembly may be secured to a knuckle 25 that has not yet been mounted to a vehicle. The assembly consisting of the bearing assembly and the knuckle may then be mounted on a vehicle body.

Figure 3:
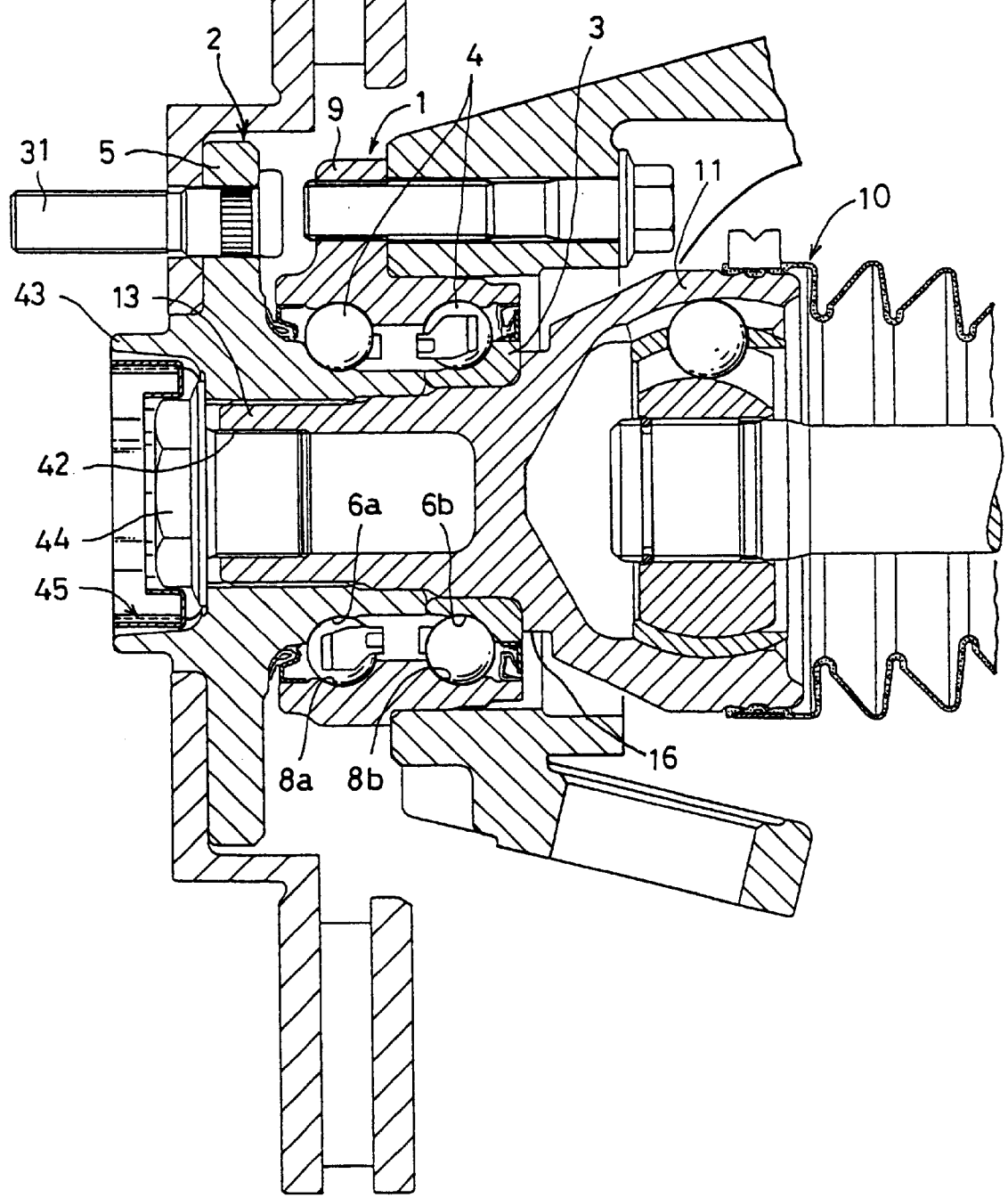
FIG. 3 is a sectional view of a second embodiment.
Figure 4B:
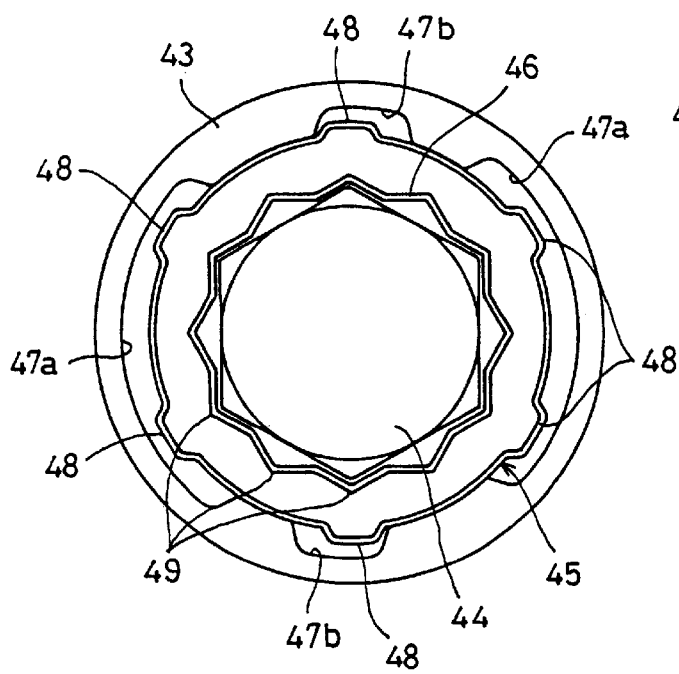
FIG. 4B is its side view.
Figure 4A:
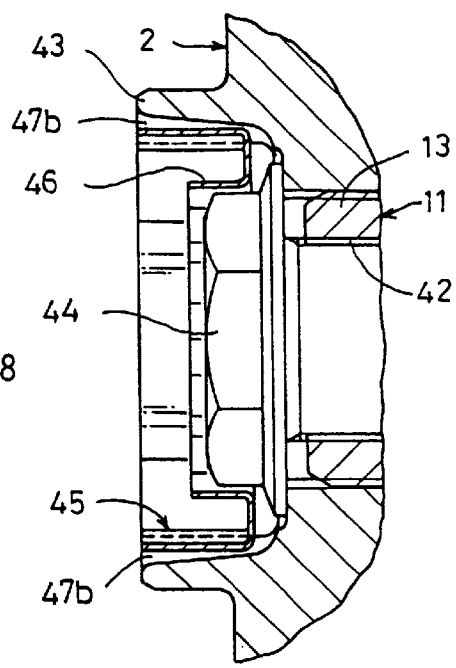
FIG. 4A is a partial sectional view of FIG. 3.
Figure 5:
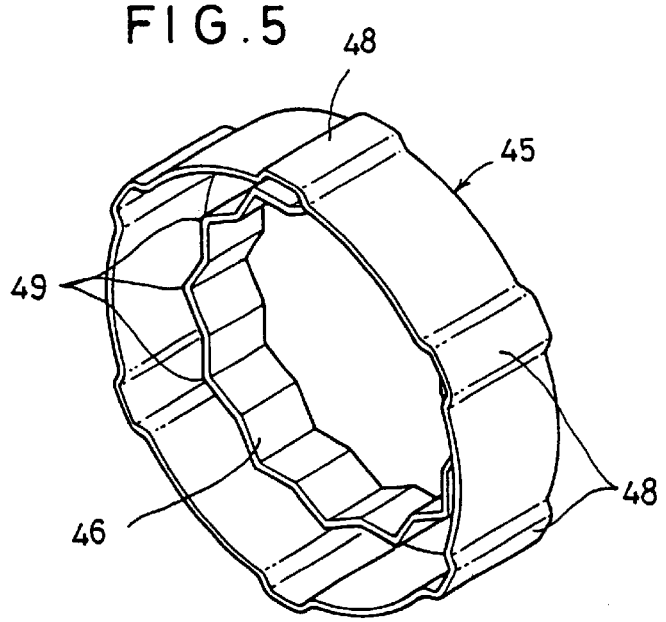
FIG. 5 is a perspective view of the cap of the embodiment of FIG. 3.

FIGS. 3–5 show a second embodiment, which is a bearing assembly for a vehicle driving wheel. It includes an outer member 1 having a flange 9 adapted to be fixed to the vehicle body on its radially outer surface and formed with two rows of raceways 8a, 8b on its radially inner surface, and an inner member 2 having a cylindrical portion mounted in the outer member 1 and formed with a raceway 6a radially opposite the outboard raceway 8a of the outer member 1.

A constant-velocity joint (CVJ) 10 coupled to an axle has a stem 13 of its outer member 11 inserted into the cylindrical portion of the inner member 2. An inner ring 3 is pressed on the CVJ outer member 11 with its outboard end abutting the inboard end of the inner member 2 and the outboard end abutting a shoulder 16. The inner ring 3 has on its radially outer surface a raceway 6b opposite the inboard raceway 8b of the outer member.

A plurality of rolling elements or balls 4 are disposed between the respective opposed pairs of raceways 8a and 6a and 8b and 6b. The inner member 2 has a radially outward flange 5 to which is mounted a vehicle wheel. The stem 13 of the CVJ outer member 11 is formed with a threaded hole 42 in its distal end face. A bolt 44 with a hexagonal head is inserted into a pilot portion 43 of the flange 5 and threaded into the threaded hole 42 to fasten the CVJ outer member 11 to the inner member 2.

As shown in FIGS. 4A and 4B, after the hexagonal head of the bolt 44 has been completely received in the pilot portion 43, a cap 45 is pressed into the pilot portion 43 to keep the bolt 44 from loosening in the pilot portion. As shown in FIG. 5, the cap 45 is formed by drawing a thin steel plate into the shape of a cup, punching a hole in the bottom of the cup and burring the edge of the hole in the direction opposite to the drawing direction to form an inner wall 46.

Two diametrically opposed pairs of axial recesses 47a and 47b are formed in the inner wall of the pilot portion 43. The recesses 47a have a greater circumferential dimension than the recesses 47b. Six axial ribs 48 are formed on the outer surface of the outer wall of the cap 45 at equal circumferential intervals. The cap 45 is pressed into the pilot portion 43 with two of the ribs 48 abutting the rear side walls of the small recesses 47b with respect to the direction in which the bolt 44 is turned when driven in so that the cap cannot turn in the bolt-loosening direction.

The inner wall 46 of the cap 45 has 12 recesses 49 in its inner surface at equal circumferential intervals. The cap is pressed into the pilot portion such that the six corners of the hexagonal head of the bolt 44 are received in six alternating recesses 49. In this state, the bolt 44 cannot turn relative to the cap and the cap 45 cannot turn in the bolt-loosening direction relative to the pilot portion 43 as mentioned above. Thus, the bolt 44 cannot turn in the loosening direction relative to the pilot portion 43.

FIG. 6 shows a third embodiment, which is the same as the second embodiment except that a different cap 45 is used to keep the bolt 44 unturnable. Like the cap in the first embodiment, the cap 45 is formed by pressing a thin steel plate, bulging the outer wall to form six ribs 51 at equal spacings and drawing the cap bottom in the opposite direction to form an inner wall 52. But it differs from the cap 45 in that it has no punched hole in the bottom and has a radially outwardly extending flange 53 along the outboard edge of the outer wall. The flange 53 abuts the pilot portion 43 when the cap 45 is fully pressed into the pilot portion 43. The bore of the pilot portion 43 is thus closed by the cap 45 and the flange 53.

FIGS. 7A, 7B show a third embodiment in which the stem 13 of the CVJ outer member 11 has a threaded distal end protruding into the pilot portion 43, and a hexagonal nut 54 is threaded onto the threaded end to fasten the CVJ outer member 11, which is coupled to an axle, to the wheel bearing assembly. A cap 45 identical in structure to the cap 45 of the first embodiment is pressed into the pilot portion 43 after the nut 54 has been tightened in position to keep the nut from loosening in exactly the same manner as in the first embodiment.

Figure 8B:
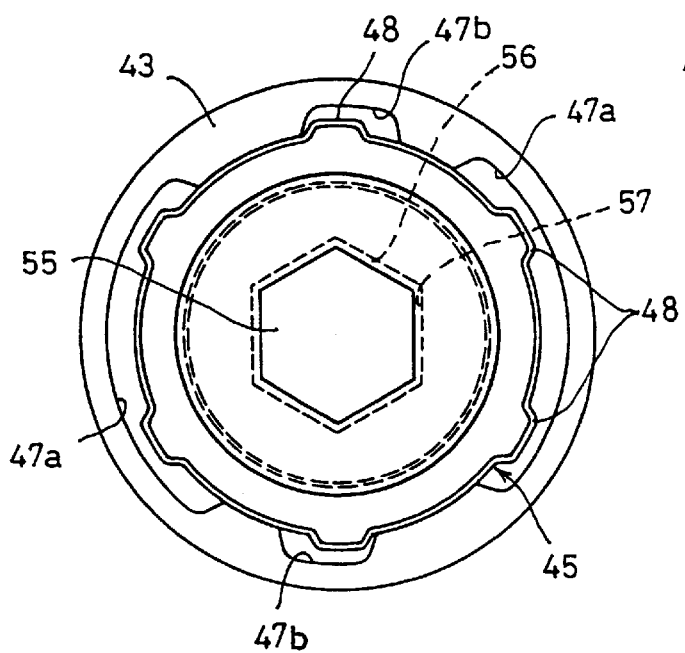
FIGS. 8A and 8B; 9A and 9B; 10A and 10B; and 11A and 11B are similar views of 5th to 8th embodiments.
Figure 8A:
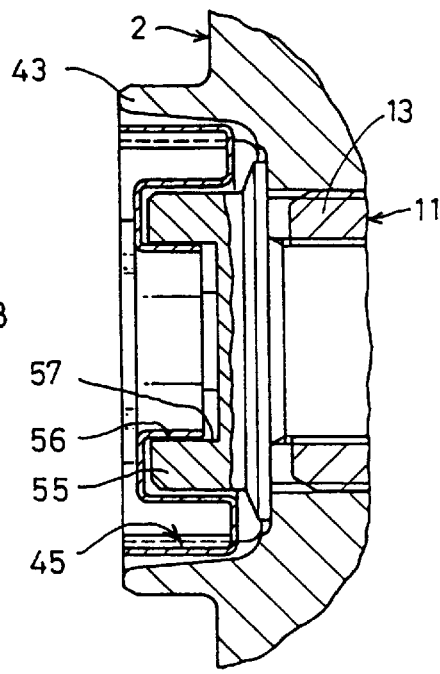

FIGS. 8A, 8B show a fourth embodiment, which is basically of the same structure as the first embodiment. But in this embodiment, the CVJ outer member 11 is fastened to the bearing assembly by a bolt 55 having a round head formed with a hexagonal hole in its top. Like the caps of the previous embodiments, a cap 45 of this embodiment is also formed by pressing a thin steel plate. It is formed by drawing the steel plate in a first direction into the shape of a cup, drawing the bottom of the cup in the direction opposite the first direction to form an inner cup, punching a hole in the bottom of the inner cup, and burring the edge of the punched hole in the first direction to form an inner hexagonal wall 56 having six corners. When the cap 45 is pressed into the pilot portion 43, the hexagonal wall 56 is received in the hexagonal hole 57 of the head of the bolt 55. Like the first embodiment, two of the six ribs 48 are received in the small recesses 47b formed in the radially inner surface of the pilot portion 43. The bolt 55 is thus prevented from loosening.

Figure 9B:
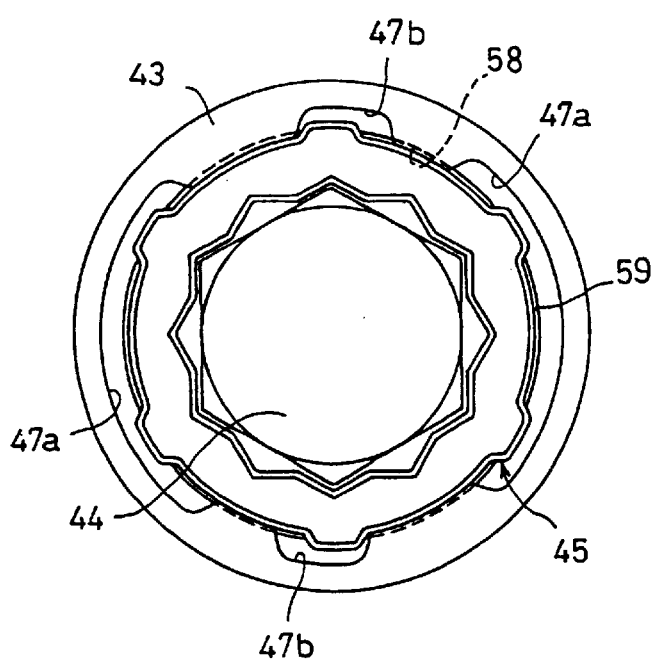
Figure 9A:
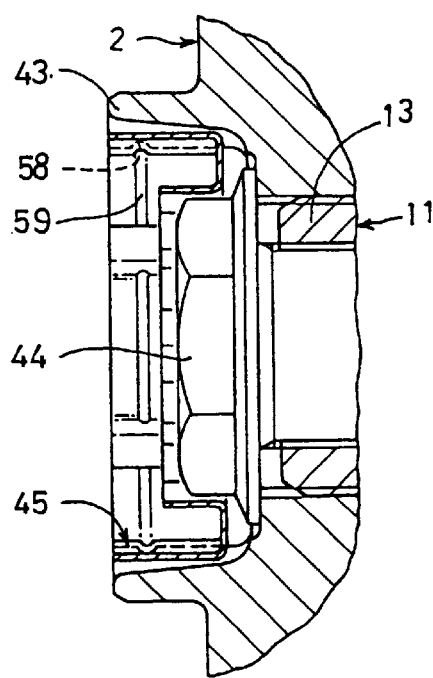

FIGS. 9A and 9B show a wheel bearing assembly of a fifth embodiment in which an annular groove 58 is formed in the radially inner surface of the pilot portion 43. A cap 45 made of a thin steel plate is formed with an annular rib 59 formed by bulging on its outer surface. When the cap 45 is pressed into the pilot portion 43, the annular rib 59 is caulked into the annular groove 58 to prevent the cap from coming off. The cap 45 is otherwise identical to the cap of the first embodiment.

Figure 10B:
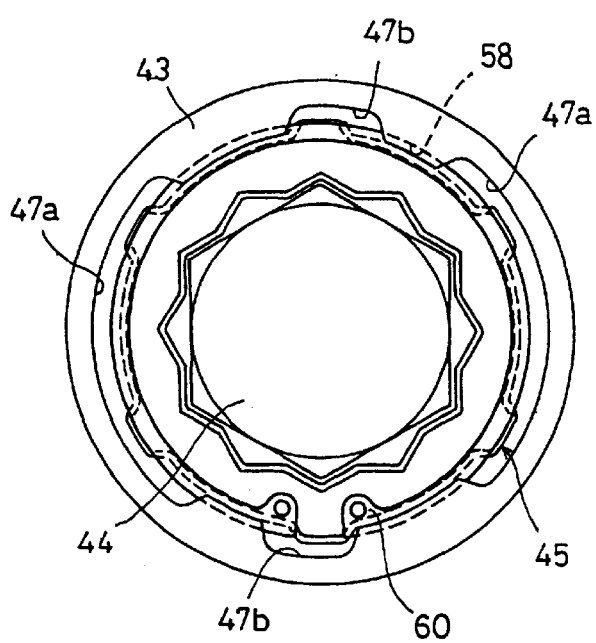
Figure 10A:
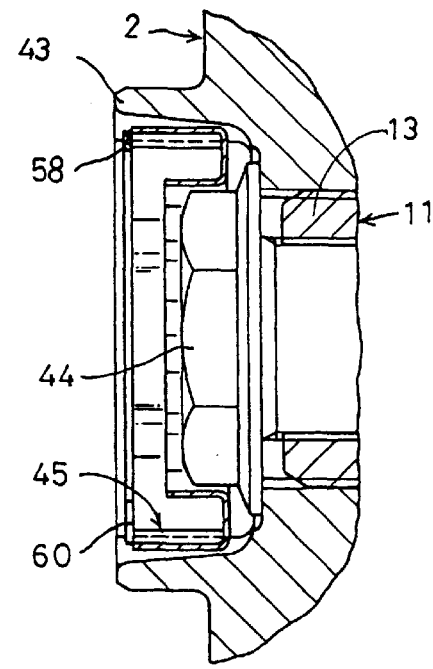

FIGS. 10A, 10B show a wheel bearing assembly of a sixth embodiment in which an annular groove 58 is formed in the inner wall of the bore of the pilot portion 43 near its opening. After the cap 45 has been pressed into the pilot portion 43, a snap ring 60 is fitted in the annular groove 58 to prevent the cap from coming off. The cap 45 is otherwise identical to the cap of the first embodiment except that the former is slightly shorter in height.

Figure 11B:
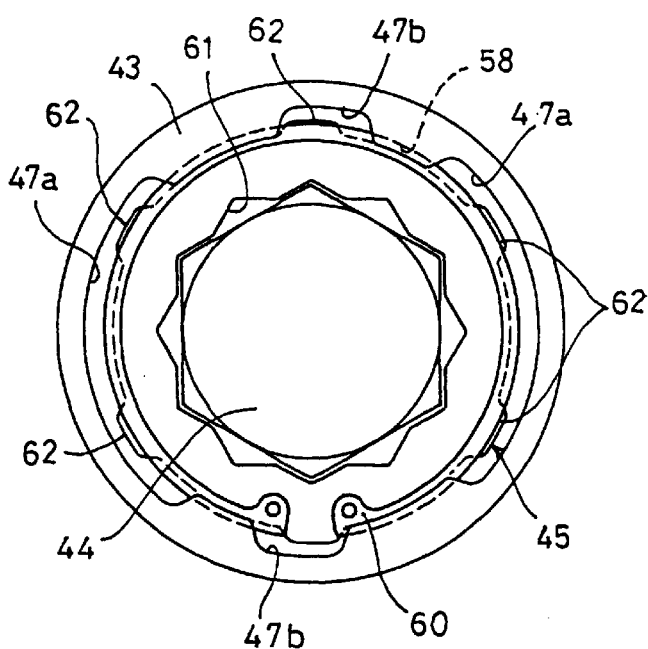
Figure 11A:
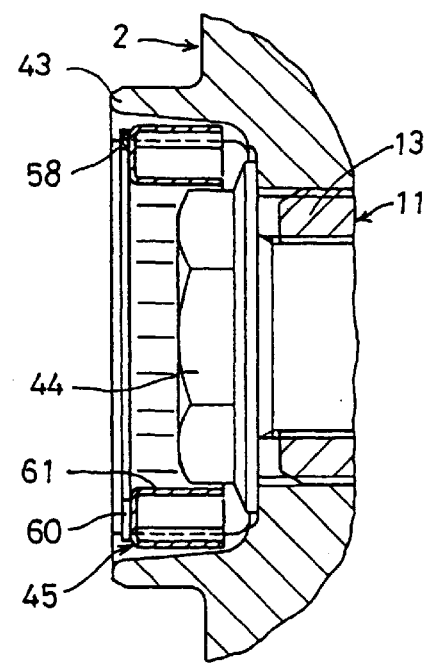

FIGS. 11A, 11B show a wheel bearing assembly of a seventh embodiment which is basically of the same structure as the sixth embodiment. But in this embodiment, a cap 45 having an inner wall 61 of the same height as the outer wall is used. Contrary to the cap of the sixth embodiment, the cap 45 is pressed into the pilot portion 43 with its open end first. A snap ring 60 prevents the cap from coming off. The ribs 62 on the outer wall and the inner wall 61 have the same sectional shapes as the counterparts of the sixth embodiment.

Figure 12:
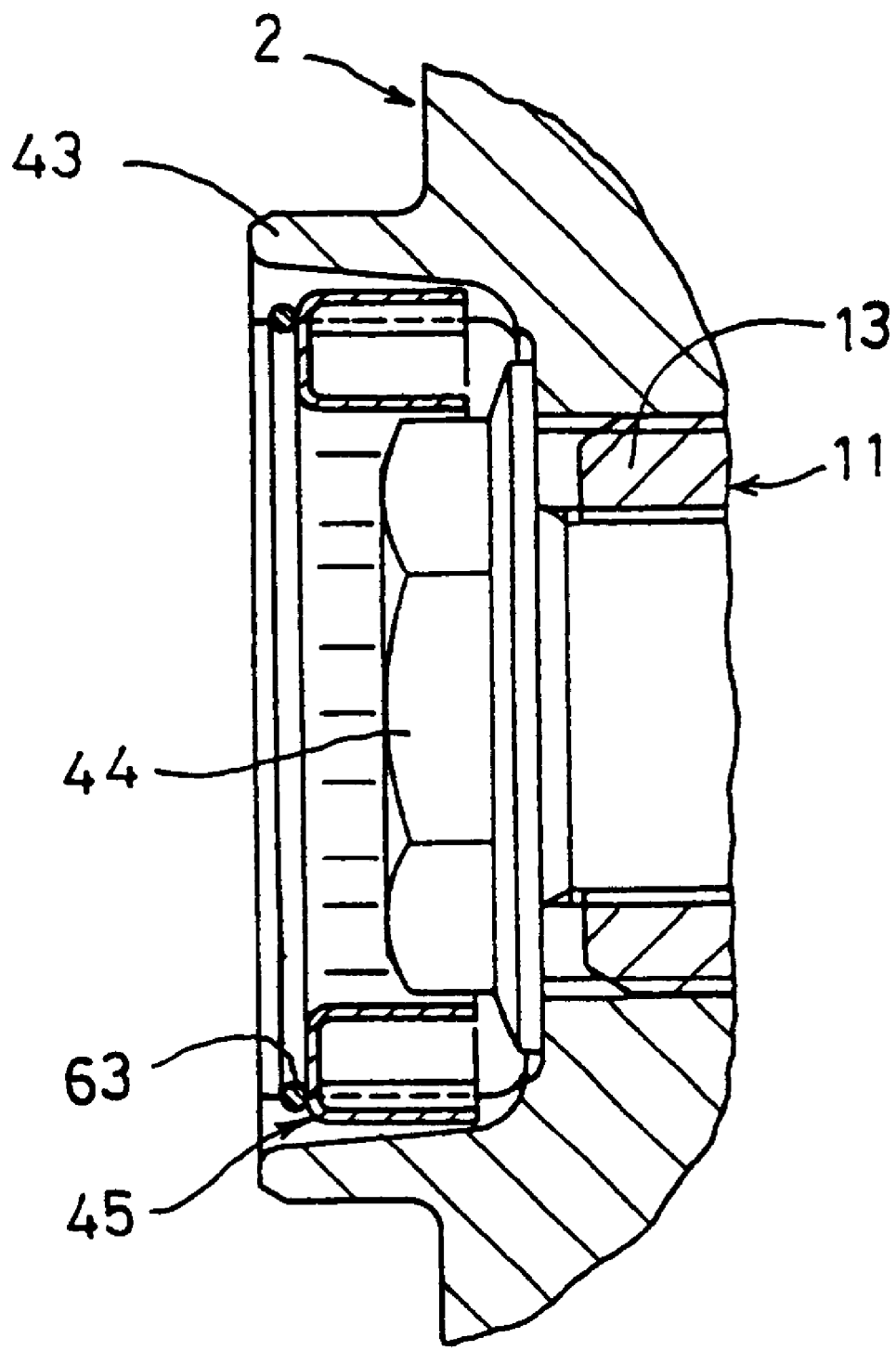
FIG. 12 is a partial enlarged sectional view of a variant embodiment.

FIG. 12 shows a wheel bearing assembly of an eighth embodiment which differs from the seventh embodiment only in that a ring clip 63 is used.

In any of the embodiments, a wheel axle is coupled to the wheel bearing assembly through a constant-velocity joint. But the former may be directly coupled to the latter.

Although in the embodiments the cap used has an inner wall with a section formed by straight portions, a cap may be used which has an inner wall with a section formed by a combination of straight and curved portions.

Figure 13:
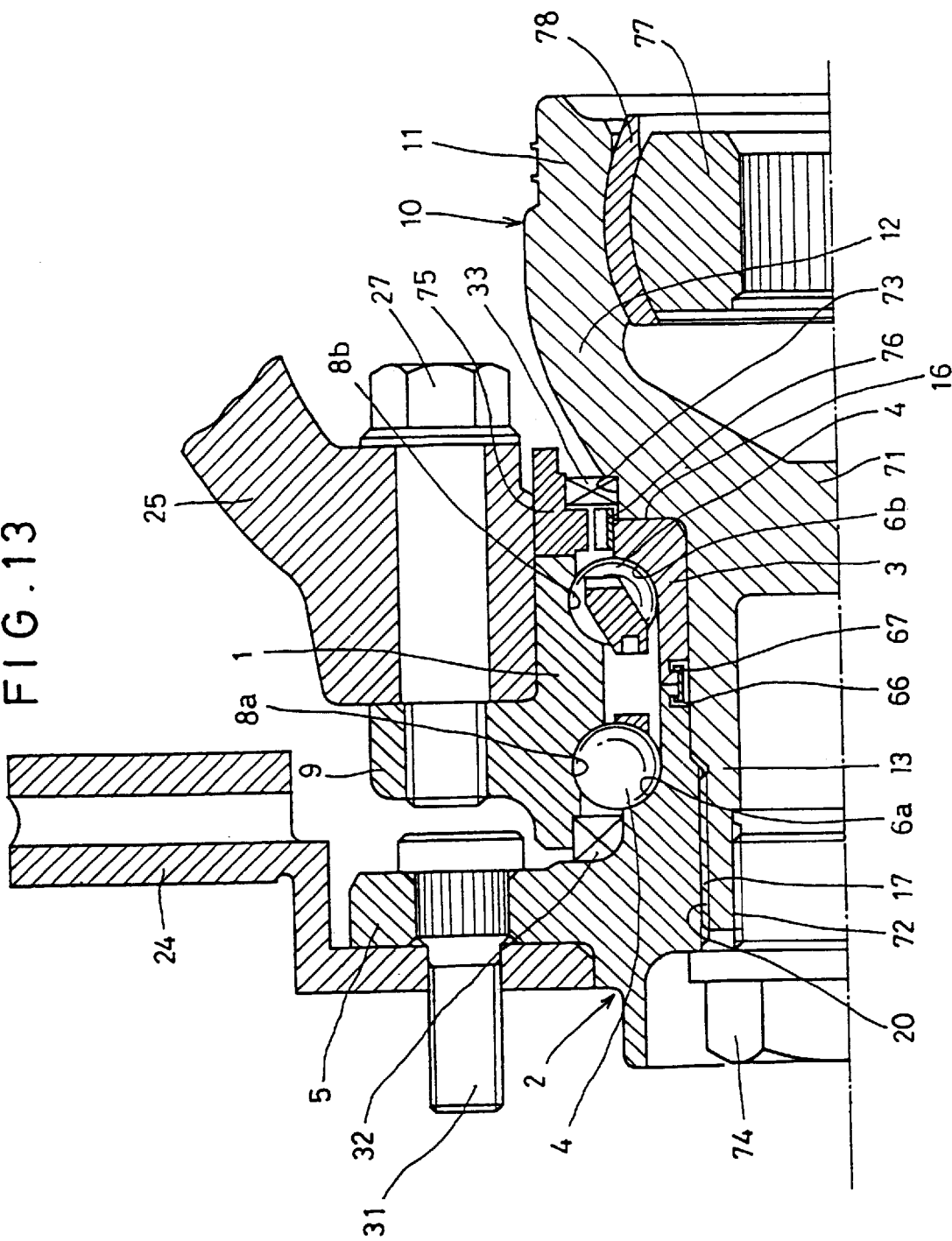
FIG. 13 is a sectional view of a ninth embodiment.

The wheel bearing assembly of a ninth embodiment (FIG. 13) comprises a bearing assembly, a constant-velocity joint 10, a brake rotor 24 and a knuckle 25 assembled together into a modular unit.

The bearing assembly comprises an outer member 1 having on its radially outer surface thereof a radially outwardly extending flange 9 fixed to the knuckle 25 by bolts 27 and formed with outboard and inboard raceways 8a and 8b on its radially inner surface, an inner member 2 formed with outboard and inboard raceways 6a and 6b on its radially outer surface so as to be opposite the raceways 8a and 8b, respectively, and outboard and inboard rolling elements 4 disposed between the respective opposed pairs of raceways.

The inner member 2 has a flange 5 on which is mounted a vehicle wheel, and an inner ring 3 pressed on the CVJ outer member 11 with its outboard end abutting the inboard end of the inner member 2 and formed with the inboard raceway 6b. The brake rotor 24 is secured by bolts 31 to the flange 5. The inner member 2 has serrations 17 on its radially inner surface.

Figure 14A:
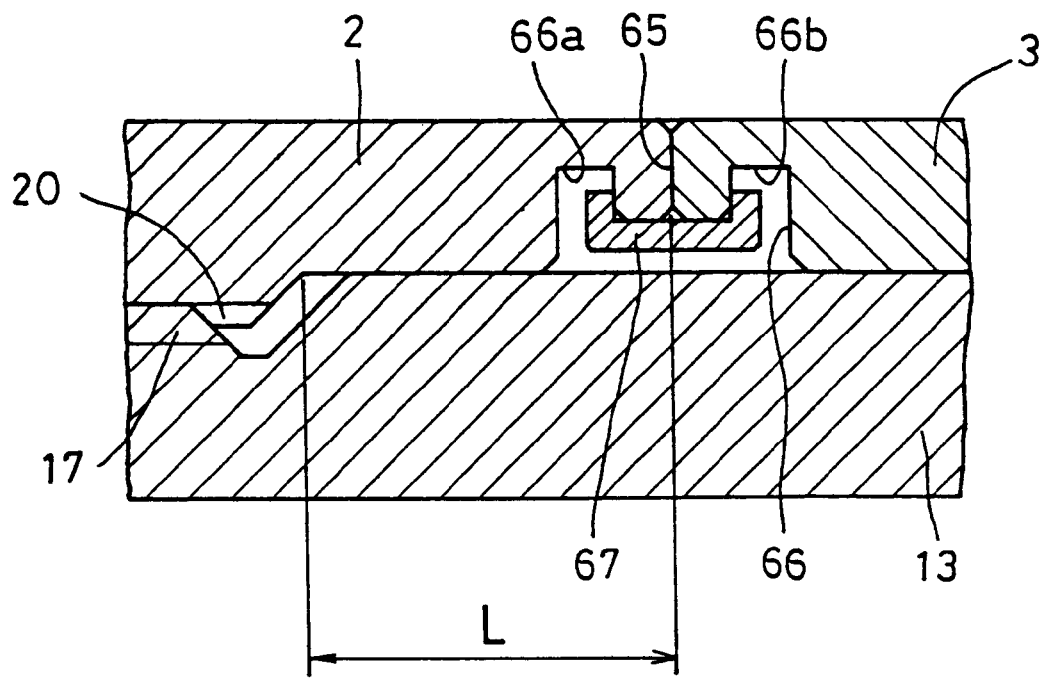
FIG. 14A is a sectional view showing the arrangement including the coupling member of the same.

The serrated bore 20 is spaced a predetermined distance L (FIG. 14A) from a surface 65 where the inner member 2 and the inner ring 3 are butted against each other. An annular groove 66 is formed in and across the radially inner surfaces of the hub ring and the inner ring 3. The annular groove 66 has annular recesses 66a and 66b formed in the inner member 2 and the inner ring 3, respectively. Since the splines are spaced the distance L from the surface where the hub ring and the inner ring are butted against each other, they do not overlap with the groove 66. This assures the strength of the hub ring.

Figure 14B:
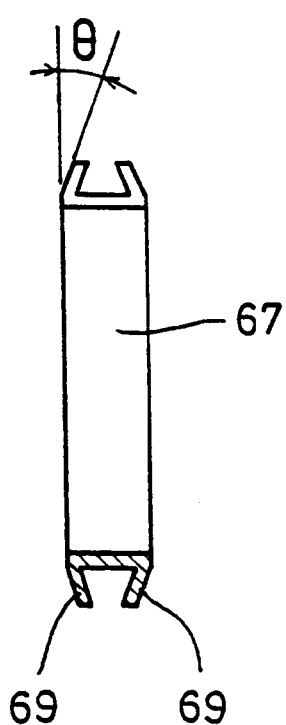
FIGS. 14B and 14C are a sectional view and a front view of the coupling member of the same.
Figure 14C:
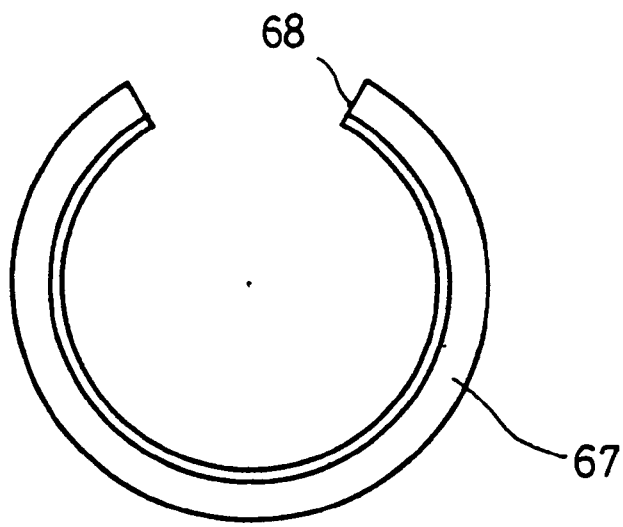

An annular coupling ring 67 of a resilient metal having radially outwardly extending flanges 69 and having a cutout 68 (FIG. 14) is received in the groove 66 with its flanges 69 engaged in the annular recesses 66a, 66b. The flanges 69 are inclined inwardly toward each other at an angle $\theta$ of 0 to 5 degrees as shown in FIG. 14B.

The coupling ring 67 is fitted in the groove 66 by deforming it such that the cutout 68 decreases. Since the flanges 69 are inclined inwardly toward each other, they are pressed against the inner walls of the recesses 66a and 66b that are near each other.

Figure 15A:
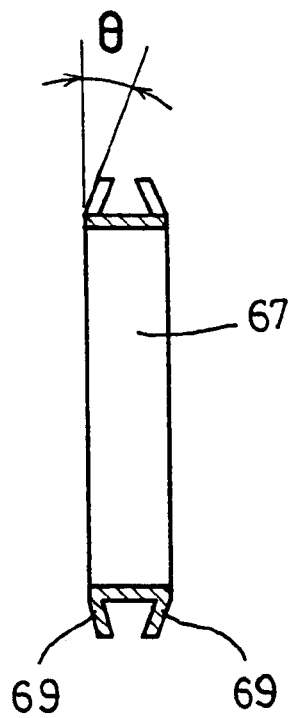
FIGS. 15A and 15B are a sectional view and a front view of a modified coupling member.
Figure 15B:
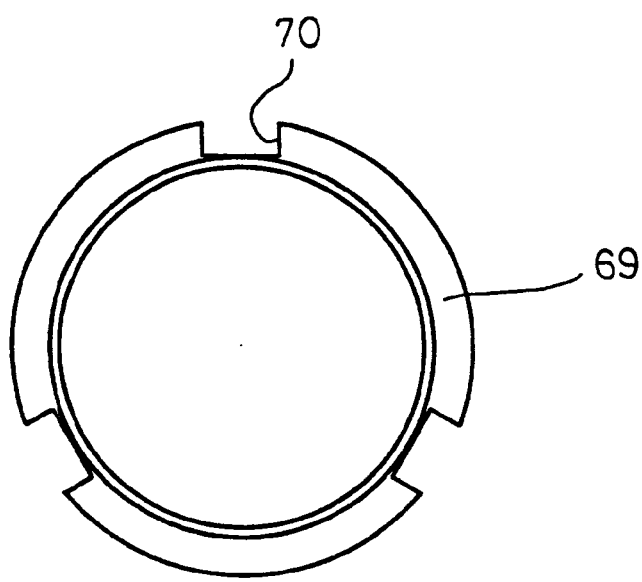

Another coupling ring 67 shown in FIG. 15 is a closed ring. Each flange 69 is circumferentially split into three portions by cutouts 70 so that each portion is resiliently deformable independently of each other. In the non-deformed state, the flanges 69 are inclined inwardly toward each other at an angle $\theta$ similar to the flanges of FIG. 14. To fit the ring 67 in the groove 66, the flanges 69 are fitted in the respective annular grooves 66a, 66b not both flanges simultaneously but one flange at a time by resiliently deforming the flanges.

The inclined flanges 69 press against the inner walls of the annular grooves 66a and 66b to pull the inner member and the inner ring toward each other. Thus the coupling ring 67 keeps them pressed against each other without shaking, rocking or otherwise moving relative to each other. The coupling ring 67 (of either embodiment) is pulled radially outwardly. This prevents its base portion from protruding radially inwardly from the radially inner surface of the inner member or the inner ring 3. When the constant-velocity joint 10 is pulled out of the bearing for maintenance, the coupling ring 67 will keep the inner ring 3 coupled to the inner member, preventing it from being pulled out together with the CVJ outer member 11.

Figure 20:
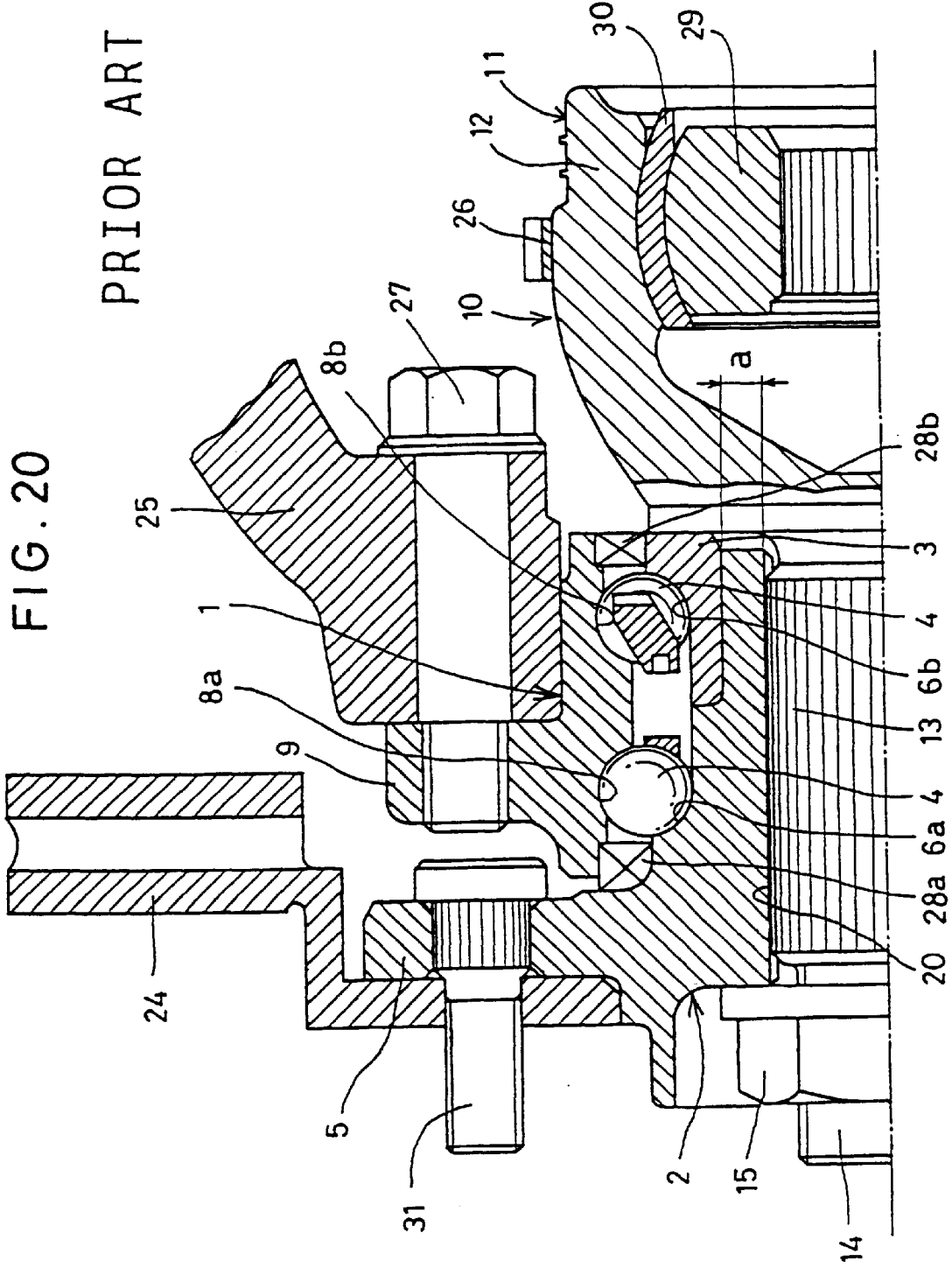

Since the inner ring 3 is coupled to the inner member by the coupling ring 67, it is not necessary to press the former onto the latter as in the prior arrangement of FIG. 20, in which in order to press the inner ring 3 onto the inner member, the additional thickness a of the portion of the inner member onto which the inner ring 3 is pressed was necessary. In this embodiment, since the inner ring 3 is not pressed onto the inner member, the entire thickness is smaller than the conventional inner member by the amount a. Thus, the bearing assembly of this embodiment is lightweight. Also, the inner member and the inner ring 3 have an accordingly greater inner diameter than those of FIG. 20.

The outer member of the CVJ 10 has an integral stem 13 on which the inner ring 3 and the inner member are fitted. From its intermediate portion to distal end, the stem 13 is formed with serrations 17 on its outer surface so as to engage the serrations on the inner surface of the inner member. The stem 13 is hollow and closed at its proximate end and open at its distal end and formed with threads 72 on its inner wall at its distal end. The stem 13 may be a solid one as shown in FIG. 20 but the hollow stem 13 is lighter in weight and thus is preferable.

Since the inner member and the inner ring 3 of this embodiment have a greater inner diameter than those of FIG. 20, it is possible to correspondingly increase the outer diameter of the stem 13 and thus the diameter and number of splines 13 and reduce the length of the serrations.

The CVJ cup portion 12 is formed with a seal land 73 on its outer surface near the boundary between the cup 12 and the stem 13. A seal 33 has its radially inner end in sliding contact with the seal land 73.

The stem 13 of the CVJ 10 is pressed into the inner member with its portion not formed with the splines 17 fitted in the inner ring 3 with a predetermined negative interference and has its serrations 17 meshing the serrated bore 20 of the inner member.

The serrated holes 20 and/or the serrations 17 may be inclined slightly relative to the axis of the bearing so that they will engage with each other with a preload to prevent the stem and the inner member from shaking relative to each other. A bolt 74 is threaded into the threads 72 on the bore of the stem 13 until its head abuts the outboard end of the inner member 2 to secure the stem 13 to the inner member.

An annular sensor 75 is fitted in a corner space defined by the inboard end of the outer member 1 and the radially inner surface of the knuckle 25. A pulser ring 76 is fitted on the inner ring 3 between the inboard rolling elements 4 and the seal land 73 so as to radially oppose the sensor 75. The sensor detects change in the magnetic flux produced by the pulser ring 76 rotating with the inner ring 3 and produces an electric signal indicative of the revolving speed of the wheel and sends it to an external control unit.

The seal 33 is fitted in the sensor 75 on the inboard side near the CVJ outer member 11 with its radially inner end in sliding contact with the seal land 73. The seal 33 thus prevents entry of dust, water or other foreign matter into the sealed space in which are housed the sensor 75 and the pulser ring 76.

At the outboard end, the gap between the outer member 1 and the inner member in which are disposed the rolling elements 4 is closed by a conventional seal 32. The CVJ inner ring 77 and the retainer 78 are the same as corresponding parts in FIG. 20.

Figure 16:
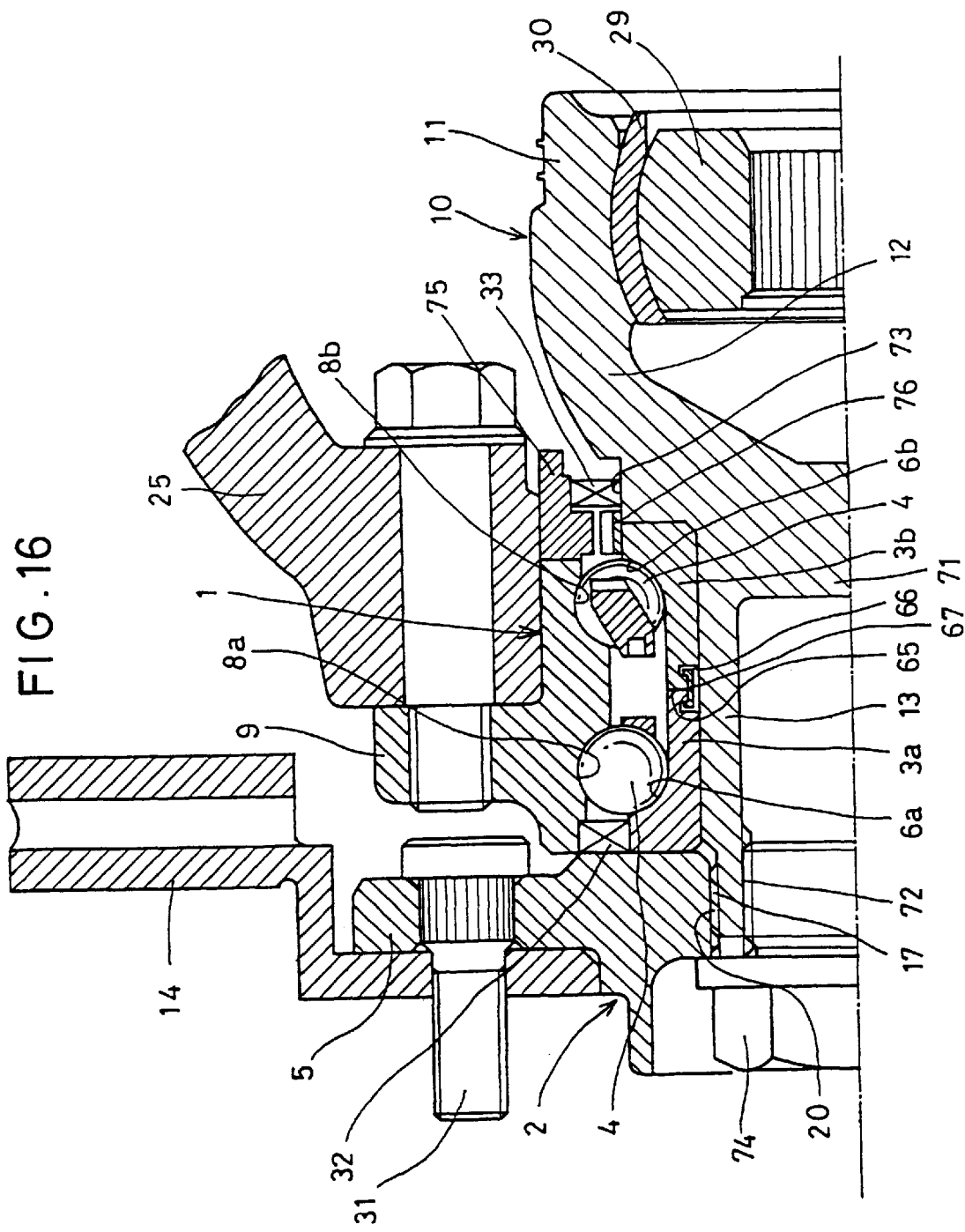
FIG. 16 is a sectional view of a tenth embodiment.

FIG. 16 shows a tenth embodiment which has a modified inner member 2 but is otherwise no different from the ninth embodiment.

The inner member 2 comprises a short base portion having a flange on which is mounted a vehicle wheel, an outboard inner ring 3a having its outboard end abutting the inboard end of the base portion, and an inboard inner ring 3b having its outboard end abutting the inboard end of the outboard inner ring 3a. The outboard and inboard raceways 6a, 6b are formed on the outboard and inboard inner rings 3a and 3b, respectively. A seal 32 is provided between the outboard inner ring 3a and the outer member 1 to seal the outboard end of the gap between the inner and outer members.

Serrations 20 formed on the inner wall of the inner member 2 engage serrations 17 formed on the outer surface of the stem 13 of the constant-velocity joint 10 at its distal end.

The outboard and inboard inner rings 3a and 3b are coupled together by the coupling means comprising a coupling ring 67 received in a groove 66 similar to the coupling means in the ninth embodiment.

When the constant-velocity joint 10 is pulled out of the bearing assembly, the inner ring 3b would not be pulled out together with the CVJ outer member 11 because it is coupled with the inner ring 3a by the coupling ring 67.

(1) The bearing assembly of this invention is compact and lightweight and can be assembled easily because engaging means are provided at a single point.

(2) The cap pressed into the pilot portion prevents the bolt or nut from turning in the loosening direction relative to the cap, and the cap is prevented from turning in the loosening direction relative to the pilot portion. Thus, the bolt or nut cannot turn in the loosening direction relative to the pilot portion.

The cap has a plurality of engaging corners adapted to engage the corners of the bolt head or the nut. The number of the engaging corners is a multiple of the number of the corners of the bolt head or the nut. Thus, each corner of the bolt head or the nut can engage any of the engaging corners of the cap.

A means for preventing the cap from coming off the pilot portion may be provided.

The cap is preferably formed by pressing a steel plate because such a cap is inexpensive.

(3) Since the inner member and the inner ring or the inboard and outboard inner rings are coupled together by the coupling member, even when the constant-velocity joint is pulled out for maintenance, the inner ring (or inboard inner ring) will remain coupled. Thus, it is possible to directly couple the inner member and the inner ring (or outboard and inboard inner rings) to the stem of the CVJ outer member. This makes it possible to reduce the thickness of the inner member, and thus to reduce the weight of the entire bearing assembly and the diameter of the serrations of the stem.

Thus, it is possible to use a hollow stem. This further reduces the weight of the entire bearing assembly.

By forming a seal land on the cup portion of the CVJ outer member, a puller ring and a sensor can be mounted in a sealed space. This improves reliability of detection. Since the speed sensor unit is mounted in a sealed space, the bearing assembly and other members such as the CVJ, brake rotor and knuckle can be easily assembled together into a modular unit.

We claim:

1. A wheel bearing assembly comprising an outer member having a flange adapted to be mounted to a vehicle body and formed with two raceways on inner surface thereof, an inner member having a flange on which a vehicle wheel is adapted to be mounted and formed with a first raceway on outer surface thereof, an inner ring formed with a second raceway on outer surface thereof, a plurality of rolling elements disposed between said raceways on said outer member and said first and second raceways, and a constant-velocity joint having an outer member comprising a cup portion and a stem portion, said stem portion mounted in and engaging said inner member through mesh engagement, said inner ring being mounted on said outer member of said constant-velocity joint with its outboard end abutting an inboard end of said inner member.

2. The wheel bearing assembly of claim 1 wherein said stem portion has its outboard end plastically deformed and engaged with an outboard end of said inner member.

3. The wheel bearing assembly of claim 1 wherein said inner member has an inner diameter smaller than the inner diameter of said inner ring.

4. The wheel bearing assembly of any of claim 1 wherein said inner ring is made from a medium-carbon or high-carbon steel.

5. The wheel bearing assembly of any of claim 1 wherein said stem portion is hollow.

6. The wheel bearing assembly of any of claim 1 wherein said cup portion has a flat bottom portion.

7. A wheel bearing assembly comprising an outer member having a flange adapted to be mounted to a vehicle body and formed with two raceways on inner surface thereof, an inner member having a flange on which a vehicle wheel is adapted to be mounted and formed with a first raceway on outer surface thereof, an inner ring formed with a second raceway on outer surface thereof, a plurality of rolling elements disposed between said raceways on said outer member and said first and second raceways, a constant-velocity joint having an outer member comprising a cup portion and a stem portion, said stem portion mounted in and engaging said inner member through mesh engagement, said flange of said inner member having a pilot portion at its outboard end, said stem portion having its outboard end inserted into and fastened to said inner member at said pilot portion by means of a fastener such as a nut and a bolt, a cap inserted into said pilot portion around said fastener, a first engaging means for engaging said fastener with said cap, and a second engaging means for engaging said cap with said pilot portion, whereby preventing said fastener from loosening.

8. The wheel bearing assembly of claim 7 wherein said first engaging means comprises an inner wall provided integrally with said cap inside of said cap, said fastener having a polygonal portion, said inner wall having a plurality of recesses arranged circumferentially so as to receive corners of said polygonal portion of said fastener.

9. The wheel bearing assembly of claim 7, wherein said second engaging means comprises at least one recess provided on one of the inner wall of said pilot portion and said cap, and at least one protrusion provided on the other so as to be received in said recess, whereby preventing said cap from loosening.

10. The wheel bearing assembly of any of claim 7 further comprising an arrangement for preventing said cap from coming out of said pilot portion.

11. The wheel bearing assembly of claim 10 wherein said arrangement comprises an annular groove formed in the inner wall of said pilot portion, and a circumferential rib formed on the outer surface of said cap so as to be pushed into said annular groove by caulking.

12. The wheel bearing assembly of claim 10 wherein said arrangement comprising an annular groove formed in the inner wall of said pilot portion, and a clip ring having a cutout, said clip ring being fitted in said annular groove to engage the outboard end of said cap.

13. The wheel bearing assembly of any of claim 7 wherein said cap is formed by pressing a steel plate.

\* \* \* \* \*